Patented July 7, 1931

1,813,365

UNITED STATES PATENT OFFICE

SAMUEL LEWIS SUMMERS, OF FORT WASHINGTON, PENNSYLVANIA

ACETYLATED DISAZO COMPOUND

No Drawing.    Application filed February 27, 1929.   Serial No. 343,242.

My invention relates to organic compounds and their manufacture and is especially concerned with a novel acetyl-derivative of the product obtained by diazotizing methylene-di(p-)phenetidine and coupling with methylene-disalicylamide. This substance is useful for pharmaceutical purposes as hereinafter indicated.

My produce is prepared by the following main steps which may be carried out as described below, though I do not limit myself to the methods given as the same ends may be attained under somewhat different conditions.

The first main step is condensing formaldehyde with p-phenetidine to produce ethoxy-amino-benzyl alcohol. One way of accomplishing this is to heat, under reflux condenser, a mixture of 137 parts p-phentidine, in 100 parts alcohol, with 120 parts 40% formaldehyde solution and 60 parts fused sodium acetate, until the odor of formaldehyde has disappeared. The product, after being washed with water and dried, has the empirical formula $C_9H_{13}O_2N$ and probably the structural formula:

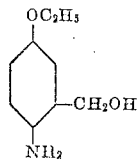

However, the $-CH_2OH$ group may be ortho to the $-OC_2H_5$ group, instead of as represented.

The second main step is to condense this with p-phenetidine to give methylene-diphenetidine. This condensation is effected by heating 150 parts of the purified ethoxyamino-benzyl alcohol obtained as above described with 174 parts of p-phenetidine hydrochloride and 1.5 parts elementary iodine to 115° C. for 12 hours. The reaction product is thoroughly washed with cold water and dried. It then has the composition represented by the empirical formula $C_{17}H_{22}O_2N_2$, and probably the structural formula:

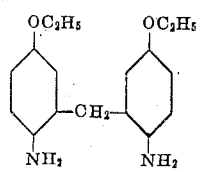

It is possible that the methylene group is ortho to the ethoxyl groups instead of as indicated; but the position which this group takes is of theoretical rather than of practical interest.

The third main step is to diazotize the methylene-di(p-)phenetidine obtained as above. This is effected by dissolving 293 parts of it in 200 parts conc. sulphuric acid, cooling this solution to 0° C., and adding to it slowly with constant stirring 140 parts of sodium nitrite dissolved in 420 parts of water, taking care that the temperature does not rise more than a few degrees. The methylene-di(p-)phenetidine diazonium sulphate is precipitated by pouring the mixture into water.

The fourth main step is coupling the above described diazonium compound with methylene-disalicylamide. To effect this coupling, the diazonium compound from the preceding step, in finely divided condition, is added with stirring to a solution of 348 parts of methylene-disalicylamide that has been dissolved, by the aid of 50 parts sodium hydroxide and 175 parts of sodium carbonate, in 1000 parts of cold water, the solution being kept at 0° C. during this addition. The reaction product which separates is thoroughly washed with cold water and dried. It then has the composition represented by the empirical formula $C_{32}H_{30}O_6N_6$, and is believed to have the structure given below, though the usefulness of the product and of its derivatives does not depend on the correctness of this belief:

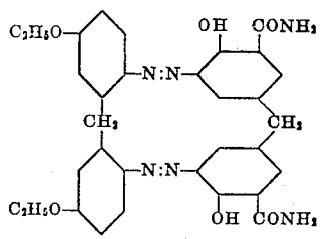

The fifth and last main step is the acetylation of this compound. One way of accomplishing this is to heat the purified and dried product obtained as described above with 190 parts glacial acetic acid and 150 parts conc. sulphuric acid to 115° C. for 12 hours under reflux. The reaction mass is poured into cold water, the solid filtered off, repeatedly washed with cold water, dried and powdered. Two acetyl groups enter the two hydroxyls of the compound represented in the above formula, giving a compound having the empirical formula $C_{36}H_{34}O_8N_6$, and believed to have the structural formula:

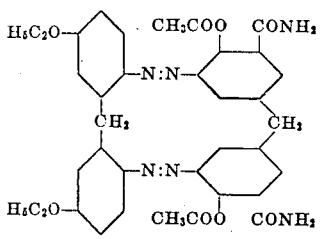

The product is useful as an antiseptic, antineuralgic, antiarthritic, and antirheumatic remedy, and is administered internally in doses of 90 to 180 grains per day.

Having thus described my invention, I claim:

1. A diacetyl derivative of the product obtained by coupling diazotized methylene-di(p-)phenetidine with methylene-disalicyl-amide, wherein the phenolic groups are the ones acetylated.

2. The acetylation derivative of the product obtained by coupling diazotized methylene-di(p-)phenetidine with methylene-di-salicyl-amide, wherein the phenolic groups are the ones acetylated.

In testimony whereof, I have hereunto signed my name at Fort Washington, Penna. this 20 day of February, 1929.

SAMUEL LEWIS SUMMERS.